Patented Apr. 27, 1937

2,078,215

UNITED STATES PATENT OFFICE 2,078,215

NONLIQUID MAPLE FLAVORING MATERIAL

Hugh E. Allen, Evanston, Ill., assignor of one-half to Albert G. McCaleb, Evanston, Ill.

No Drawing. Application November 22, 1935, Serial No. 51,075

2 Claims. (Cl. 99—141)

My invention contemplates and provides a novel maple flavoring material which is in non-liquid form—being a dry, or only very slightly moist, finely divided sweet composition which is non-caking, free-flowing and endowed with a flavoring strength of genuine maple which is greatly in excess of the flavoring strength of the finest maple sugar or the most concentrated maple syrup.

My new composition finds many uses, in the confectionery and bakery arts, with industrial confectioners and bakers and in the household, in the production of candy, candy fillers, cake icings, ice cream, pancake syrup, etc.

From time immemorial, the use of maple flavor, by industrial confectioners and bakers, and in the household, has been greatly limited because of the unsatisfactory forms in which genuine maple flavor has been available. Prior to about the year 1927 genuine maple flavor was to be found only in maple sap, maple syrup and maple sugar. The sap, for obvious reasons, was and is entirely unsuitable for distribution to or use by confectioners, bakers or householders. Both maple syrup and maple sugar are, per unit volume, so lacking in flavoring strength, that the sheer bulk of syrup and/or sugar required to attain a sufficiently pronounced maple flavor was more often than not prohibitive. Moreover, the syrup, being a sticky liquid, and the maple sugar with its sureness to cake and harden, had physical properties which greatly hampered and limited their use in the confectionery and bakery arts.

In the year 1927, or thereabout, John B. Wilson and John W. Sale first disclosed a chemical precipitation process and laboratory technique for the production, from maple sap, maple syrup and/or maple sugar, of what has come to be known as "genuine maple flavor concentrate",—this product being a brown liquid which is undesirably sticky and of objectionable staining propensities, but, nevertheless, a concentration of true maple flavor in strength approximately forty times that of the best maple syrup and, of course, many times greater than the flavoring strength of maple sugar (as maple sugar at the best represents only a maximum concentration of maple syrup of about 1.3 maple syrup to 1 part maple sugar.) Since the pioneering of Wilson and Sale, other processes and technique have been devised for the production of genuine maple flavor concentrate.

Genuine maple flavor concentrate, because of its liquidity, its sticky character and its tendency to stain everything with which it contacts, has not become an important article of commerce. Its production has not been great because its use has been largely confined to the impartation, by addition, of maple flavor to simple syrup substitutes for genuine maple syrup. The liquidity of genuine maple flavor concentrate has minimized, and in many cases prevented, its use in those confectionery and bakery processes wherein the thinning of processed foodstuffs by an added flavoring ingredient is objectionable or intolerable.

The objectives and accomplishments of the present invention, briefly stated, are:

(1) The widening of the field of usefulness for genuine maple flavor concentrate; and (2) The provision of a sugar based genuine maple flavoring material which (a) is a non-liquid—being either quite dry or only slightly moist, (b) which is not sticky, (c), which is finely divided, (d) which does not cake and harden after the fashion of maple sugar, (e) which, despite its sugar content, will not ferment after the fashion of maple syrup, (f) which does not stain by contact, and (g) which is satisfactory as a flavoring agent in many confectionery and bakery processes wherein maple syrup and maple sugar and/or genuine maple flavor concentrate are quite unsuitable.

In manufacturing my new non-liquid maple flavoring material, I utilize (a) genuine maple flavor concentrate, which, if desired, may be made by the previously mentioned process of Wilson and Sale; (b) granulated sugar—preferably cane sucrose—; (c) a non-volatile and preferably substantially colorless and tasteless liquid (specifically, glycerine) which, with a relatively much greater quantity of genuine maple flavor concentrate, will form a non-sticky, non-staining, homogeneous mixture or stable emulsion which will coat the individual particles of sugar with which it is mechanically intermixed.

I find the following formula, wherein percentages are by weight, to be satisfactory:

| | Percent |
|---|---|
| Genuine maple flavor concentrate | 1 to 10 |
| Glycerin | ½ of 1 to 3 |
| Granulated sucrose (preferably cane) | 98½ to 87 |

The glycerin is slowly added to the genuine maple flavor concentrate while the latter is being vigorously agitated, the agitation being continued for some minutes after the introduction of all of the glycerin, thoroughly to glycerinate the genuine maple flavor concentrate and to form a homogeneous mixture of the two liquids.

The sugar is preferably ground, in a hammer mill, to semi-pulverulent form, i. e., to a substantial degree of fineness not quite as pronounced as that of commercial pulverized sugar. The semi-pulverulent sugar is next agitated in a power mixer. The glycerinated genuine maple flavor concentrate is then slowly sprinkled upon the sugar during its agitation, and the agitation is continued for some time after the introduction of the glycerinated genuine maple flavor concentrate to insure that the latter thoroughly coats the individual particles of the sugar.

What I claim as new and desire to secure by Letters Patent of the United States, is:

1. A non-liquid maple flavoring material of non-sticky and non-staining character comprising sugar having its particles coated with maple flavor concentrate which is rendered non-staining and non-sticky by reason of the presence therein of glycerine.

2. A finely divided maple flavoring material comprising semi-pulverulent sugar having its particles coated with maple flavor concentrate which is non-staining and non-sticky by reason of the presence therein of glycerine.

HUGH E. ALLEN.